Patented Oct. 23, 1951

2,572,046

UNITED STATES PATENT OFFICE 2,572,046

PROCESS FOR RECOVERING PARTHENYL CINNAMATE AND ESSENTIAL OILS FROM GUAYULE RESIN

James W. Meeks and Thomas F. Banigan, Jr., Salinas, Calif., and Ralph W. Planck, New Orleans, La., assignors to the United States of America as represented by the Secretary of Agriculture No Drawing. Application November 15, 1949, Serial No. 127,504

8 Claims. (Cl. 260—476)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to isolating parthenyl cinnamate and the essential oils from guayule resin and has among its objects an improved and simplified process which permits the rapid removal of parthenyl cinnamate in a high yield and comparatively pure state and the essential oils from other resin components without damage to the latter.

Parthenyl cinnamate may be used as an intermediate for chemical synthesis. Thus it may be hydrolyzed to prepare partheniol and cinnamic acid.

The term "guayule resin" is used herein in the same sense as commonly used in the industry, i. e., as meaning those constituents of the guayule shrub (Parthenium argentatum, Gray) that are obtained when the comminuted shrub or the resinous rubber prepared from such shrub is extracted with acetone, ethyl alcohol, or similar oxygenated organic solvents well known in the art of preparing deresinated rubber. Based on the dry weight of the shrub this resin fraction constitutes about 6–9%, and on the dry weight of the milled rubber about 20–25%. The composition of this resin tends to vary somewhat, at least in percentage composition with regard to the primary components, depending on the choice of deresinating solvent employed.

It is known that parthenyl cinnamate is present in guayule resin. However its isolation from this complex material has previously been difficult and inefficient.

In general, the process of the present invention involves mixing a water-miscible, organic solvent solution of the guayule resin with a hydrocarbon in which the parthenyl cinnamate is more soluble than in the organic solvent. The hydrocarbon containing the parthenyl cinnamate is then separated from the mixture. The hydrocarbon is evaporated from the separated solution leaving a residue which is dissolved in other water-miscible, organic solvent and the parthenyl cinnamate crystallized therefrom.

An advantage of the present process is that the essential oil which is present in the guayule resin can be recovered after isolation of the parthenyl cinnamate. Thus in the extraction process, the essential oil is transferred to the hydrocarbon phase together with the parthenyl cinnamate. When this hydrocarbon phase is evaporated, the residue dissolved in a crystallizing solvent, and the parthenyl cinnamate crystallized out, as above described, essential oil remains in the mother liquor and can be readily separated therefrom by fractional distillation. Since the essential oil consists largely of alpha-pinene, it can be used as a solvent, particularly in paints, and can also be used as an intermediate in the preparation of lubricating oil addition agents, and so forth.

A description of the present process in greater detail is as follows: A solution of guayule resin in a water-miscible, organic solvent is first established. This solution may be one prepared by dissolving guayule resin in a water-miscible, organic solvent. However this solution may also be that obtained when comminuted guayule shrub or resinous guayule rubber is extracted with a water-miscible, organic solvent for the purpose of removing the resin from such materials as an incident to preparing resin-free guayule rubber.

A wide choice is possible with regard to the particular water-miscible, organic solvent used. In general, those solvents which are useful for the deresination of guayule shrub or resinous guayule rubber are preferred. Thus ethanol because of its low cost, high solvency characteristics for guayule resin, and particularly because of its relatively poor solvency powers with regard to plant waxes is highly efficient. Other solvents which may be used are, for example, methanol, propanol, isopropanol, butanols, acetone, and so forth. If desired, mixtures of individual solvents may be employed.

In the preferred practice, the solution of guayule resin in the water-miscible, organic solvent is then de-waxed. This is readily accomplished by allowing the solution to stand, preferably under refrigeration, whereupon the wax will precipitate out of solution and can be easily separated as by filtration or centrifugation. However, it is not essential to remove the waxes at this point as they may be removed at a further stage in the process as will appear hereinafter.

The solution of guayule resin in the water-miscible, organic solvent is then mixed with the hydrocarbon. The mixture is then allowed to stand whereupon two phases separate. The parthenyl cinnamate is more soluble in the hydrocarbon than in the water-miscible, organic solvent. Hence it is present in the hydrocarbon phase. This phase is separated, as by decantation, and evaporated to remove the hydrocarbon therefrom.

A wide choice is possible with regard to the particular hydrocarbon solvent used. Aliphatic hydrocarbons such as pentane or mixtures of aliphatic hydrocarbons such as petroleum ether and other volatile petroleum fractions are preferred. Any other non-polar solvent, which is essentially immiscible in the solution of the guayule resin in the water-miscible, organic solvent and which possess a greater affinity for the parthenyl cinnamate than does the water-miscible solvent, may, however, be used.

The residue remaining after evaporation of the hydrocarbon is dissolved in a minimum quantity of water-miscible, organic solvent. The resulting solution is cooled whereupon the parthenyl cinnamate will crystalize out of solution.

If the resin has not previously been de-waxed the wax is removed before the parthenyl cinnamate is crystallized out. This may be accomplished by allowing the solution to stand and removing the wax which precipitates by centrifugation or filtration. Upon further standing the crystals of parthenyl cinnamate will appear. As the crystallizing solvent, ethanol is also preferred, although any of the water-miscible, organic solvents, such as are initially employed for preparing the resin solution, may be used.

After the crystals of parthenyl cinnamate are separated from the crystallizing solvent, the mother liquor may be subjected to fractional distillation to recover the essential oil which is present in this remaining mother liquor.

The following examples exhibit the invention in greater detail.

EXAMPLE I

A—Dewaxing of Resin 125 gallons of an acetone extract of comminuted guayule shrub (variety 593), containing 1.5% solids was subjected to evaporation under vacuum. The residue separated into two phases—an upper aqueous phase (1.5 gallons) and a lower phase consisting of the guayule resin (1.35 gallons). The resin was washed repeatedly with warm water to remove water-soluble impurities, pressed dry, then dissolved in hot 95% ethanol (10 volumes of ethanol per volume of resin). This alcohol solution was allowed to stand at room temperature to precipitate most of the plant waxes (about ⅔ gallon) which were then removed by filtration. There was thus obtained 13 liters of a de-waxed solution of guayule resin in 95% ethanol—solids content 13.77 g./100 ml.

B—Extraction of Resin Solution

The 13 liters of solution as obtained in part A was extracted batchwise with pentane in three successive portions. The extracts were separately evaporated to dryness and the residues dissolved in a minimum quantity of boiling ethanol and allowed to cool slowly. The parthenyl cinnamate crystallized over a period of several days and was obtained as large platelet crystals. The volumes of pentane used and the results obtained are set forth in the following table:

*Table*

| | Volume of pentane, liters | Yield of parthenyl cinnamate | |
|---|---|---|---|
| | | grams | per cent |
| First exact | 4 | 8.00 | 48.0 |
| Second | 4 | 7.52 | 45.1 |
| Third | 2 | 1.14 | 6.9 |

The three fractions of parthenyl cinnamate were combined and recrystallized from 150 ml. of 95% ethanol whereby 15.31 g. of the parthenyl cinnamate was obtained in two fractions: main crop, 12.31 g., M. P., 128.5–129° C.; and second crop 3.00 g.

EXAMPLE II

A de-waxed guayule resin solution in 95% ethanol containing about 14% solids was divided into two 200-ml. portions which were treated with the following solvents: (a) Pentane; (b) petroleum ether.

Each 200-ml. portion was extracted three times with 100 ml. (per time) of its respective solvent. The extracts were separately evaporated to dryness, redissolved in a minimum quantity of warm 95% ethanol, and allowed to stand for 48 hours or until crystallization of parthenyl cinnamate seemed complete.

(a) From the extraction with pentane, 0.245 gram of parthenyl cinnamate was obtained.

(b) From the extraction with petroleum ether, 0.22 gram of parthenyl cinnamate was obtained.

Having thus described the invention, what is claimed is:

1. A process for isolating parthenyl cinnamate from guayule resin containing it which comprises mixing a water-miscible, organic solvent solution of the guayule resin with a hydrocarbon in which the parthenyl cinnamate is more soluble than in the water-miscible organic solvent, and separating the hydrocarbon containing the parthenyl cinnamate from the mixture.

2. A process in accordance with claim 1 wherein the water-miscible, organic solvent is ethanol.

3. A process in accordance with claim 1 wherein the hydrocarbon is pentane.

4. A process in accordance with claim 1 wherein the hydrocarbon is petroleum ether.

5. A process in accordance with claim 1 wherein the water-miscible, organic solvent is ethanol and the hydrocarbon is pentane.

6. A process in accordance with claim 1 wherein the water-miscible, organic solvent is ethanol and the hydrocarbon is petroleum ether.

7. A process for isolating parthenyl cinnamate from guayule resin containing it which comprises mixing a water-miscible, organic solvent solution of the guayule resin with a volatile hydrocarbon in which the parthenyl cinnamate is more soluble than in the water-miscible, organic solvent, separating the hydrocarbon containing the parthenyl cinnamate from the mixture, evaporating the hydrocarbon from the separated solution, dissolving the residue in a water-miscible, organic solvent, and crystallizing the parthenyl cinnamate therefrom.

8. A process for isolating parthenyl cinnamate from guayule resin containing it and plant waxes which comprises establishing a solution of the guayule resin in a water-miscible, organic solvent, allowing the solution to stand until plant waxes are precipitated, removing the precipitated plant waxes from the solution, mixing the remaining solution with a hydrocarbon in which the parthenyl cinnamate is more soluble than in the water-miscible, organic solvent, and separating the hydrocarbon containing the parthenyl cinnamate from the mixture.

JAMES W. MEEKS.
   THOMAS F. BANIGAN, Jr.
   RALPH W. PLANCK.

REFERENCES CITED

The following references are of record in the file of this patent:

Alexander, Berichte, vol. 44 (II) (1911), pp. 2320–2328.

Walter, J. A. C. S., vol. 66 (1944) pp. 419–421.

Haagen-Smith et al., J. A. C. S., vol. 70 (1948) pp. 2075–2079.